Dec. 27, 1966  H. TRUAX  3,294,383
ROTARY SCREEN MACHINE FOR PROCESSING HEAT
SENSITIVE GRANULAR ORGANIC MATERIALS
Filed June 24, 1964  3 Sheets-Sheet 1

INVENTOR.
HARRY TRUAX
BY Robert E. Harris
ATTORNEY

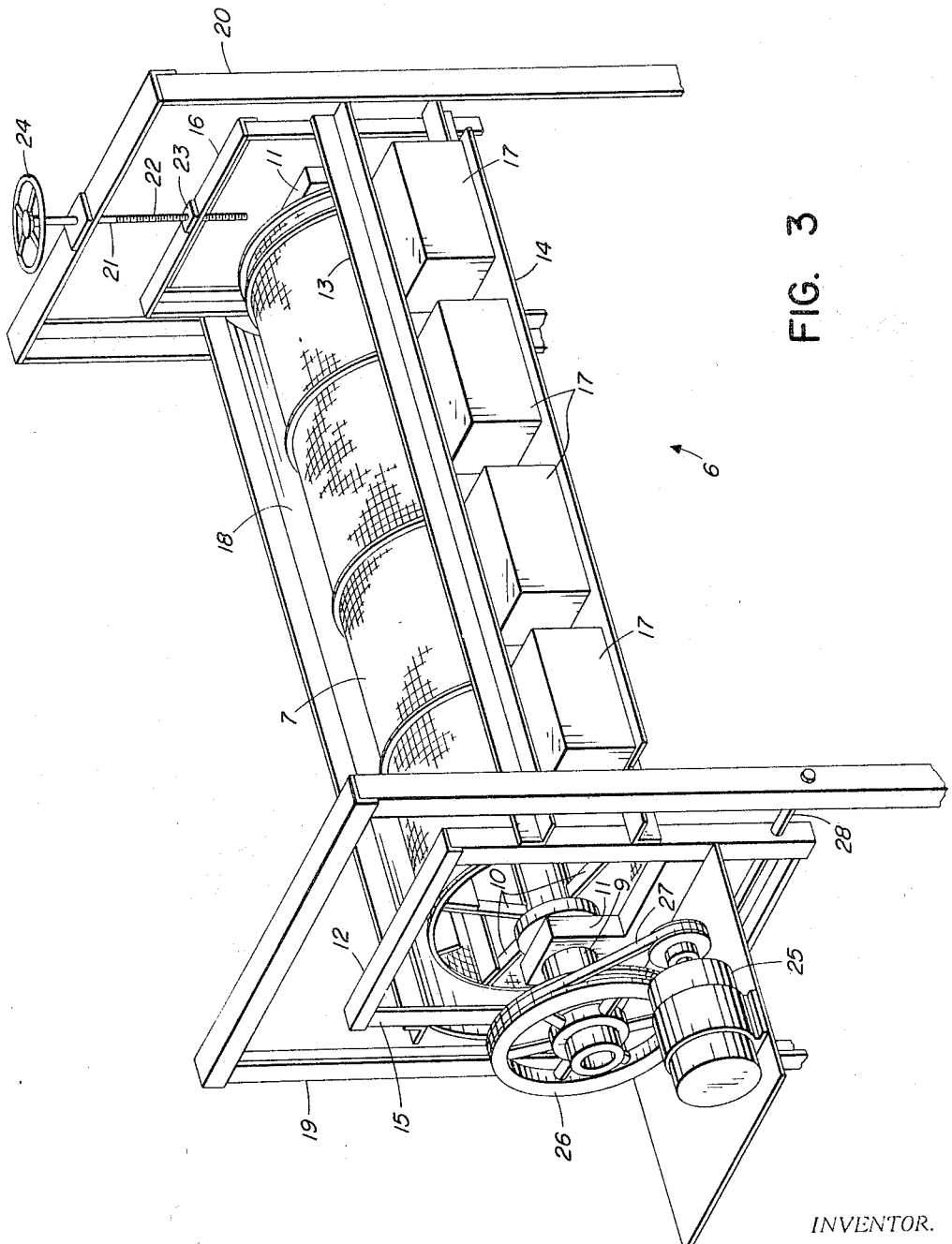

United States Patent Office 3,294,383
Patented Dec. 27, 1966

3,294,383
ROTARY SCREEN MACHINE FOR PROCESSING HEAT SENSITIVE GRANULAR ORGANIC MATERIALS
Harry Truax, Rural Route, Mooresville, Ind. 46158
Filed June 24, 1964, Ser. No. 377,602
15 Claims. (Cl. 263—33)

This invention relates to a machine for processing heat sensitive granular organic materials and more particularly to a processing machine for heating whole raw unextracted soybeans by infra-red rays to render the beans palatable and upgrade the nutrient value without adversely affecting protein value.

Considerable research has been conducted in recent years in an attempt to improve and/or find acceptable products that can be fed to livestock. One of the better potential products that can be used for feed is soybeans. While extracted soybean meal has been used as feed in the past, this feed has become relatively expensive recently due, at least in part, to the drop in price in the world market of extracted soybean oil, the meal being a by-product of this oil extracting process. In addition, soybean meal requires expensive additives to upgrade the nutrient value of the feed, many of which are lost in the oil extraction process.

Raw unextracted soybeans, although rich in nutrients required by livestock and poultry, cannot be used by the farmer in the raw, or native, state because uncooked soybeans have a bitter taste and are therefore unpalatable, and also have active enzymes which retard the digestive process of the animal. It is therefore necessary to process the soybeans to make them platable and also to destroy the proteolytic enzyme growth inhibitor which reduces the speed of digestion of livestock.

The processing of soybeans has, however, become an economic stumbling block to the use of the soybeans as feed heretofore since the only known acceptable processing methods required expensive machinery and the resultant cost of the processed soybeans made them commercially unacceptable for use as feed. In addition, prior methods required steam pressure and autoclaves to cook the beans by moist heat, thus necessitating further processing to at least dry the processed soybeans before they could be used as feed. The resulting process was, therefore, not only expensive but also very time consuming.

Some efforts have been made in the past to develop a machine for processing soybeans that would not require moist heat. The machines developed to date, however, have either proven entirely ineffectual and inefficient or have failed to accomplish their intended purpose when dry heat, rather than moist heat, was utilized.

It is therefore an object of this invention to provide a machine for processing heat sensitive granular organic materials, and particularly soybeans, which machine is relatively simple, compact, and yet highly efficient for its intended purpose.

It is another object of this invention to provide an improved machine for processing heat sensitive granular organic materials through the use of dry heat.

It is still another object of this invention to provide a machine for processing heat sensitive granular organic materials utilizing infra-red heat rays.

It is yet another object of this invention to provide a soybean processing machine capable of heating the soybeans uniformly throughout to thereby render the soybean platable and upgrade the nutrient value without adversely affecting the protein value thereof.

It is still another object of this invention to provide a machine for processing heat sensitive granular organic materials wherein said granular materials are repeatedly cascaded through infra-red heat rays so that said granular materials are uniformly heated throughout.

It is still another object of this invention to provide a processing machine for heat sensitive granular organic materials having a screen forming a cylinder in which said granular materials are confined, said screen having fins therein and being rotated so that said granular materials are repeatedly cascaded, said granular materials being heated by infra-red heaters located outside said screen whereby said infra-red rays are at least partially absorbed and re-radiated by said screen to thereby uniformly heat said granular materials within said cylinder throughout.

With these and other objects in view which will become apparent to one skilled in the art as the description proceeds, this invention resides in the novel construction, combination and arrangement of parts substantially as hereinafter described and more particularly defined by the appended claims, it being understood that such changes in the precise embodiment of the herein disclosed invention may be included as come within the scope of the claims.

The accompanying drawings illustrate one complete example of the embodiment of the invention constructed according to the best mode so far devised for the practical application of the principles thereof, and in which:

FIGURE 3 is a perspective view of the processing machine of this invention.

Figure 1:
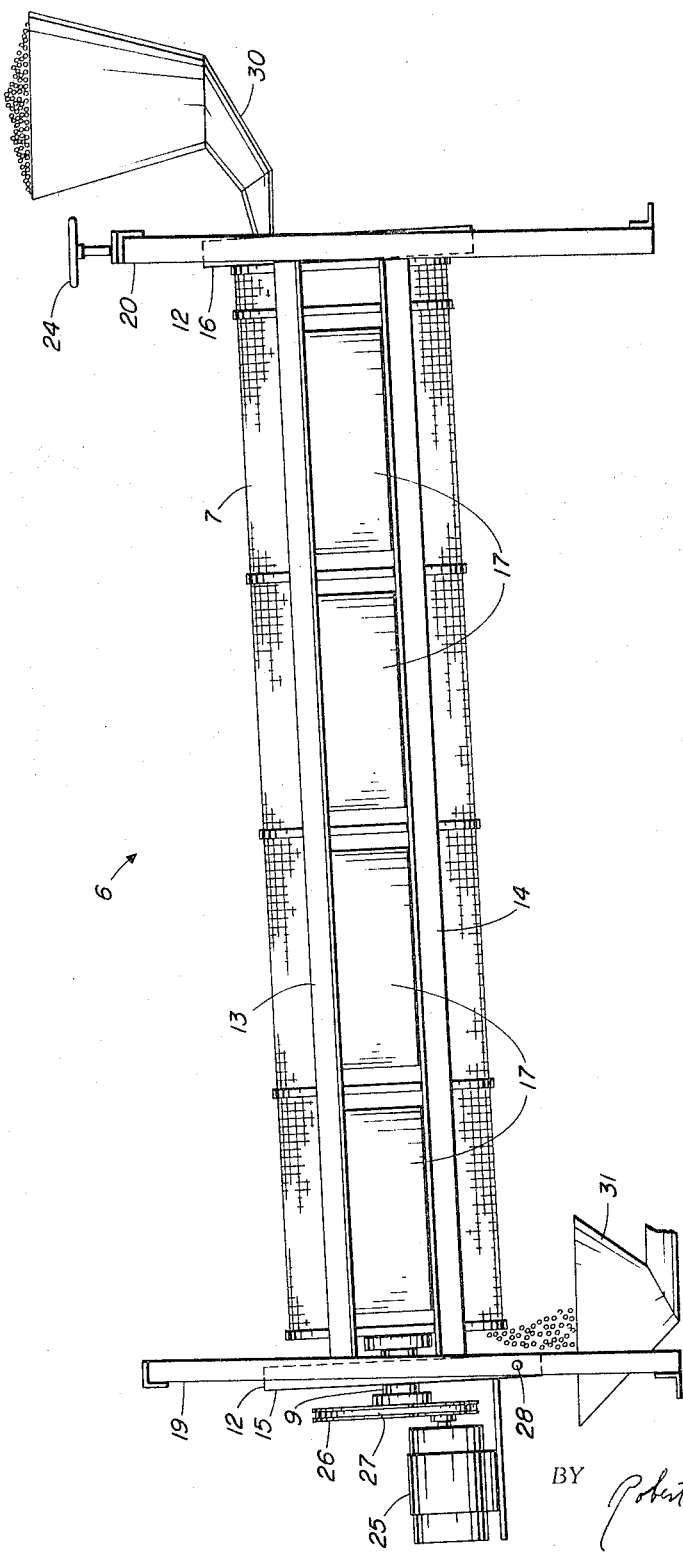
FIGURE 1 is a side elevational view of the processing machine of this invention.

Referring now to the drawings in which like numerals have been used for like characters throughout, the numeral 6 refers generally to the processing machine of this invention, which machine, as shown best in FIGURE 3, includes a long cylinder 7 formed of screen or mesh material, said cylinder defining a processing chamber, or area, 8. Cylinder 7 is coaxially mounted on a shaft 9 by means of rod-like supports 10 spaced along shaft 9.

Shaft 9 is mounted for rotation in blocks 11 located near the opposite ends of the shaft. Blocks 11, in turn, are mounted on inner frame 12, which frame may, as shown in FIGURE 3, be formed of angle irons conventionally fastened together, as by welding. Frame 12 includes a pair of spaced angle iron members 13 and 14 connected between end portions 15 and 16 (blocks 11 are mounted on the end portions). Angle irons 13 and 14 are spaced apart sufficiently to receive a plurality of infra-red heaters 17 therebetween. Four such heaters are shown in FIGURE 1, but it is to be realized that any number of heaters could be utilized as is necessary to accomplish the intended purpose. It is also to be realized that while only a single cylinder is shown herein, more than one cylinder could be used if it were desired to provide additional heating in a minimum of space.

A metallic reflector 18 is positioned at the side of cylinder 7 opposite heaters 17 so that the rays, or waves, from heaters 17 that pass through screen cylinder 7 are reflected by reflectors 18 back toward the screen cylinder.

Inner frame 12 is supported by means of U-shaped outer frames 19 and 20. As shown in FIGURES 1 and 3, end 15 of inner frame 12 is pivoted on frame 19 by means of rod 28, while end 16 of inner frame 12 is connected to frame 20 by means of a height adjustment means 21, which may consists, as shown in FIGURE 3, of a shaft 22 rotatably mounted on frame 20 and having screw threads at one end received in a threaded aperture 23 in end 16 of frame 12. For ease of adjustment a wheel 24 may be attached to shaft 22.

To rotate cylinder 7, a motor 25 is mounted on end 15 of inner frame 12 and a spocket 26 is mounted on the end of shaft 9 extending beyond block 11. A belt 27 provides driving power between the motor and sprocket.

Heat sensitive granular organic materials, usually soybeans, are introduced into the processing area 8 (defined by screen cylinder 7) by means of a hopper 30 connected to end 16 of inner frame 12, this being adjacent to the higher end of cylinder 7. At the lower end of cylinder 7, processed granular materials fall from the processing area 8 into a second hopper 31, the processed soybeans then being ready for use as feed.

In a working model of this invention, cylinder 7 is ten feet long and has seven burners stationed along the length of the cylinder. The infra-red burners utilized LP gas as fuel and the rays emitted from an Inconel grid. Screen cylinder 7 is a metallic mesh comprising about 45% metal and 55% open space. With this unit, a production capacity of at least twelve hundred pounds of beans per hour has been achieved.

Figure 2:
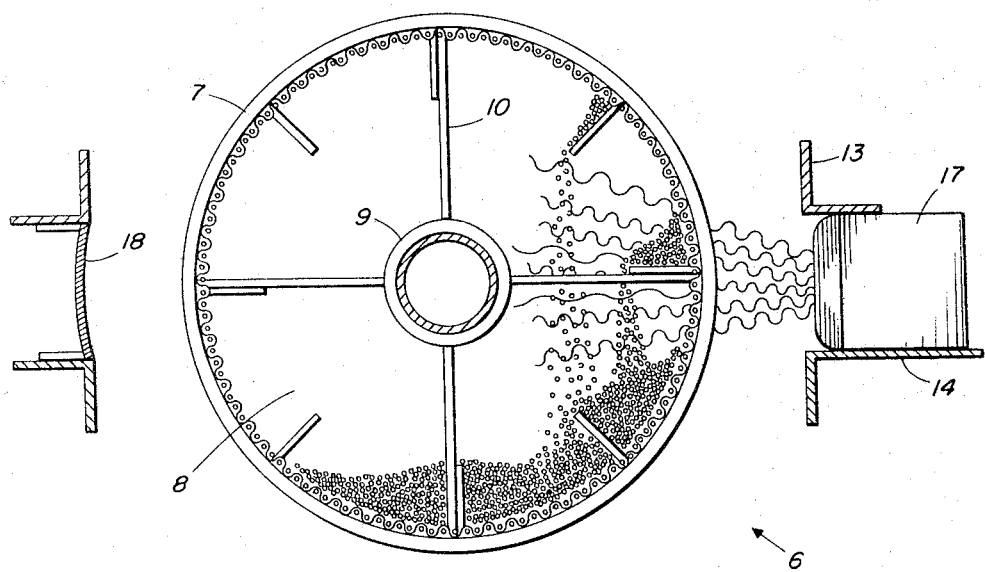
FIGURE 2 is an end sectional view of the processing machine as shown in FIGURE 1.

In operation, the soybeans are introduced into the processing area 8 through hopper 30 and fall to the bottom of the cylinder 7. Radially inwardly directed fins within the cylinder repeatedly raise the beans to a point near the top of the cylinder where they fall from the fins, as shown in FIGURE 2, and tumble, or cascade, through the infra-red rays. As this repeatedly occurs, the beans slowly traverse the length of the cylinder since the cylinder is positioned at a slight downward angle, as brought out hereinabove. When reaching the other end the soybeans fall into hopper 31 and are ready for use.

The infra-red rays from burners 15 either pass through the screen mesh and strike the beans cascading downwardly or strike the metal of the screen and are absorbed and re-radiated by the screen at a longer wave-length. At the other side of the screen the same thing occurs, the waves going outside the chamber striking the reflector 18 and then being reflected back inside the chamber through the screen. It is found that this cascading allows the beans to be heat treated uniformly throughout since they are intermittently in the path of the infra-red rays.

In addition, since the screen acts as an attenuator by absorbing and re-radiating at longer wave-lengths, a spectra of wave-lengths strike the cascading beans. This combination of intermittent exposure to a variety of infra-red wave-lengths for a period of six to fifteen minutes with a temperature of the bean as it emerges being between 225° and 250° Fahrenheit renders the soybean palatable by de-bittering the same, destroys the growth inhibiting enzymes and other deleterious constituents of most legume seeds, and yet preserves the needed protein value of the soybean.

The speed of rotation of the cylinder and the angle of the cylinder with respect to horizontal can be adjusted as necessary for the particular conditions and the length of the cylinder can, of course, be pre-selected and the cylinder itself can be divided into two or more processing chambers as would be obvious to one skilled in the art.

In view of the foregoing it should be obvious to those skilled in the art that the processing machine of this invention provides a heretofore unavailable means for treating heat sensitive granular organic materials, and more particularly soybeans, by means of infra-red rays and produces a palatable processed bean which has been upgraded in nutrient value without adversely affecting protein value.

What is claimed as my invention is:

1. A machine for processing heat sensitive granular organic materials, comprising: a substantially cylindrically shaped screen forming a processing chamber; fin means within said processing chamber adjacent to said screen; means for introducing heat sensitive granular organic materials into said processing chamber; a heat radiating source external of but adjacent to said processing chamber for emitting heat rays to said chamber through said screen; means for rotating said screen about its longitudinal axis whereby said granular organic materials in said chamber are repeatedly caused by said fins to be passed through said heat rays whereby said granular materials are uniformly heat treated throughout and thereby rendered more palatable and upgraded in nutrient value without adversely affecting protein values; and means for expelling processed granular organic materials from said processing chamber.

2. The machine of claim 1 wherein said cylindrically shaped screen comprises about 45% solid material and 55% open area.

3. The machine of claim 1 wherein said heat radiating source is an infra-red burner the emission from which is pulsated in reaching said processing chamber by said screen to thereby cause deeper penetration of said rays into said granular organic materials.

4. A machine for processing whole unextracted raw soybeans comprising: a substantially cylindrically shaped screen forming a processing chamber; fin means within said processing chamber adjacent to said screen; means for introducing whole unextracted raw soybeans into said processing chamber; a heat radiating source external of but adjacent to said processing chamber for emitting heat rays to said chamber through said screen; means for rotating said screen about its longitudinal axis whereby said soybeans in said chamber are repeatedly caused to be cascaded through said heat rays by said fins whereby said soybeans are uniformly heat treated throughout and thereby rendered palatable and up-graded in nutrient value without adversely affecting protein values; and means for expelling processed soybeans from said processing chamber.

5. A machine for processing heat sensitive granular organic materials comprising: a screen forming a processing chamber, said screen being substantially cylindrically shaped and having its axis nearly horizontally positioned; substantially radially inwardly directed fins extending from the perimeter of said screen; means for introducing heat sensitive granular organic materials into said processing chamber; an infra-red heater external of but adjacent to said processing chamber for emitting heat rays there-toward; means for rotating said screen about its axis whereby granular organic materials within said processing chamber are caused by said fins to be repeatedly cascaded through said heat rays, said heat rays being of various wave-lengths due to absorption and re-radiation by said screen whereby granular materials within said processing chamber are rendered palatable and upgraded in nutrient value without adversely affecting the protein values; and means for expelling processed organic materials from said processing chamber.

6. The machine of claim 5 further characterized by means for adjusting the position of said cylindrically shaped screen so that its axis is varied with respect to horizontal positioning.

7. A machine for processing soybeans comprising: a screen forming a processing chamber, said screen being substantially cylindrically shaped and having its axis horizontally positioned; substantially radially inwardly directed fins extending from the perimeter of said screen; means for introducing whole unextracted soybeans into said processing chamber for emitting heat rays there-toward; means for rotating said screen about its axis whereby said soybeans within said processing chamber are caused by said fins to be repeatedly cascaded through said heat rays, said heat rays being of various wave-lengths due to absorption and re-radiation by said screen whereby said soybeans are rendered palatable and up-graded in nutrient value without adversely affecting protein values; and means for expelling processed soybeans from said processing chamber.

8. A means for processing heat sensitive granular organic materials comprising: a screen forming a processing chamber, said screen being substantially cylindrically shaped and having its axis tilted slightly from a horizontal position; a plurality of fins protruding from said screen inwardly directed toward said axis thereof, said fins extending along substantially the entire length of said screen; a plurality of infra-red heaters spaced along but outside said screen for emitting heat rays theretoward; means for introducing granular organic materials to said chamber at the higher end; means for rotating said screen whereby said materials within said chamber are carried past all of said infra-red heaters and are repeatedly cascaded through said heat rays emitted therefrom, said heat rays being of various wave-lengths due to absorption and re-radiation by said screen whereby said granular materials within said chamber are rendered palatable and upgraded in nutrient value without adversely affecting protein values; and means at the lower end of said processing chamber for permitting said processed granular materials to be removed from said chamber.

9. The machine of claim 8 wherein said processed granular materials removed from said chamber are heated to a temperature of between 225° and 250° Fahrenheit.

10. The machine of claim 8 further characterized by a solid metallic reflector etxernal of but adjacent to said processing chamber, said metallic reflector being positioned opposite said infra-red heaters so that energy emitted therefrom is reflected back through said screen into said processing chamber.

11. A machine for processing whole unextracted soybeans comprising: a screen forming a processing chamber, said screen being substantially cylindrically shaped and having its axis tilted slightly from a horizontal position; a plurality of fins protruding from said screen and being inwardly directed from the perimeter thereof toward said axis thereof, said fins extending along substantially the entire length of said screen; a plurality of infra-red heaters spaced along, but outside, said screen for emitting heat rays theretoward; means for introducing whole unextracted soybeans to said chamber at the higher end; means for rotating said screen whereby said soybeans within said chamber are carried past all of said infra-red heaters and are repeatedly cascaded through said heat rays emitted from said heaters, said heat rays being of various wavelengths due to absorption and re-radiation by said screen whereby said soybeans are rendered palatable and upgraded in nutrient value without adversely affecting the protein values; and means at the lower end of said processing chamber for permitting said processed soybeans to be removed from said chamber.

12. A machine for processing heat sensitive granular organic materials comprising: a processing area; means for introducing heat sensitive granular organic materials into said precessing area; a substantially cylindrically formed continuously rotating screen surrounding said processing area; an infra-red heater adjacent to said processing area, said radiation means producing an emission at different wave-lengths which pass through said screen before reaching said processing area; means including inwardly directed fins connected to the perimeter of said screen for causing said granular organic materials within said processing area to be passed through said emission from said radiation means whereby said granular materials are substantially uniformly heat treated throughout and are thereby rendered palatable and upgraded in nutrient value without adversely affecting the protein values of said materials; and means for expelling processed granular materials from said processing area.

13. A machine for processing heat sensitive granular organic materials, comprising: a screen forming a processing chamber; means for introducing heat sensitive granular organic materials into said processing chamber; a heat generating source adjacent to said processing chamber, said source radiating heat waves; means including inwardly directed fins connected to the perimeter of said screen for causing said granular organic materials within said chamber to be passed through said heat waves from said heat generating source whereby said granular organic materials are substantially uniformly heat treated throughout and are thereby rendered palatable and upgraded in nutrient value without adversely affecting the protein values of said materials; and means for expelling said heat sensitive granular organic materials from said processing chamber.

14. A machine for processing heat sensitive granular organic materials, comprising: a processing chamber including a rotary screen; means for introducing heat sensitive granular organic materials into said processing chamber; a heat generating source adjacent to said processing chamber, said source radiating primarily infra-red heat waves; fin means for causing said granular organic materials within said chamber to be repeatedly cascaded through said heat waves from said heat generating source whereby said granular organic materials are substantially uniformly heat treated throughout and are thereby rendered palatable and upgraded in nutrient value without adversely affecting the protein values of said materials; and means for expelling said heat sensitive granular organic materials from said processing chamber.

15. The machine of claim 14 further characterized by a reflector at the side of said rotary screen opposite that of said source radiating primarily infra-red heat waves.

References Cited by the Examiner

UNITED STATES PATENTS

| | | | |
|---|---|---|---|
| 241,294 | 5/1881 | Burns | 263—33 |
| 593,163 | 11/1897 | Okell | 263—33 |
| 1,133,047 | 3/1915 | Limburg et al. | 263—33 |
| 3,152,873 | 10/1964 | Wright | 34—4 X |

FREDERICK L. MATTESON, JR., *Primary Examiner.*

JOHN J. CAMBY, JAMES W. WESTHAVER,
*Examiners.*